US009678960B2

(12) United States Patent
Robert et al.

(10) Patent No.: US 9,678,960 B2
(45) Date of Patent: Jun. 13, 2017

(54) METHODS AND SYSTEMS OF DYNAMIC CONTENT ANALYSIS

(71) Applicant: DISNEY ENTERPRISES, INC., Burbank, CA (US)

(72) Inventors: Arnaud Robert, Simi Valley, CA (US); Mark Arana, West Hills, CA (US); Edward Drake, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 233 days.

(21) Appl. No.: 13/903,946

(22) Filed: May 28, 2013

(65) Prior Publication Data

US 2014/0214846 A1 Jul. 31, 2014

Related U.S. Application Data

(60) Provisional application No. 61/759,355, filed on Jan. 31, 2013.

(51) Int. Cl.
*G06F 17/00* (2006.01)
*G06F 17/30* (2006.01)

(52) U.S. Cl.
CPC .............. *G06F 17/30032* (2013.01)

(58) Field of Classification Search
CPC ......... G06F 17/30867; G06F 17/30864; G06F 17/3087; G06F 17/30873; G06F 17/30876
USPC ........................................................ 707/706
See application file for complete search history.

(56) References Cited

U.S. PATENT DOCUMENTS

| 8,055,029 B2* | 11/2011 | Petrescu | G06K 9/00234 382/118 |
| 2005/0108775 A1* | 5/2005 | Bachar | G06Q 50/22 725/135 |
| 2012/0317085 A1* | 12/2012 | Green | G06F 17/30867 707/704 |
| 2014/0215505 A1* | 7/2014 | Balasubramanian | H04N 21/4722 725/13 |

* cited by examiner

*Primary Examiner* — Truong Vo
(74) *Attorney, Agent, or Firm* — Sheppard, Mullin, Richter & Hampton LLP

(57) ABSTRACT

Methods and systems of dynamic content analysis for categorizing media contents are provided. Data regarding the media contents that a user is watching on one or more devices is obtained, and the environment in which the user is watching the media contents may be captured. Metadata categorizing the events and the media contents can be generated, and the metadata may be further associated with a corresponding event.

21 Claims, 7 Drawing Sheets

METHODS AND SYSTEMS OF DYNAMIC CONTENT ANALYSIS

CROSS-REFERENCE TO RELATED APPLICATIONS

This application claims the benefit of U.S. Provisional Application No. 61/759,355, filed on Jan. 31, 2013 and which is hereby incorporated herein by reference in its entirety.

TECHNICAL FIELD

The present application relates generally to categorizing media contents, more particularly, some embodiments relate to methods and systems of dynamic content analysis.

DESCRIPTION OF THE RELATED ART

Driven by advances in computer networking and communication technologies, delivery of personalized supplementary information such as advertising and education has become popular. The personalized supplementary information accompanying the media provides more opportunities for many entities, services, and agencies across almost all industries such as advertising, educational, and entertainment. Generally, categorizing the media content that the user is watching is necessary for providing such personalized supplementary information.

BRIEF SUMMARY OF THE APPLICATION

According to various embodiments of the application, methods and systems of dynamic content analysis are provided. In particular, methods and systems of dynamic content analysis for categorizing media contents are provided. In various embodiments, data regarding the media contents that a user is watching on one or more devices may be obtained. The data may comprise media signals delivered to the devices and the display of the media contents. Scene analysis may be performed to process the data for categorizing the media contents. Scenes and events may be detected and recognized. Metadata categorizing the events and the media contents can be generated. The metadata may be further associated with a corresponding event.

In some embodiments, the environment in which the user is watching the media contents is also captured. The user's concurrent activities including the user's facial expressions, body movements, statements, and internet activities may be gathered from secondary sources. Such information may be used in recognizing events that are related to the media contents and in determining supplementary information to be displayed to the user.

Other features and aspects of the application will become apparent from the following detailed description, taken in conjunction with the accompanying drawings, which illustrate, by way of example, the features in accordance with embodiments of the application. The summary is not intended to limit the scope of the application, which is defined solely by the claims attached hereto.

BRIEF DESCRIPTION OF THE DRAWINGS

The present application, in accordance with one or more various embodiments, is described in detail with reference to the following figures. The drawings are provided for purposes of illustration only and merely depict typical or example embodiments of the application. These drawings are provided to facilitate the reader's understanding of the application and shall not be considered limiting of the breadth, scope, or applicability of the application. It should be noted that for clarity and ease of illustration these drawings are not necessarily made to scale.

Figure 1:
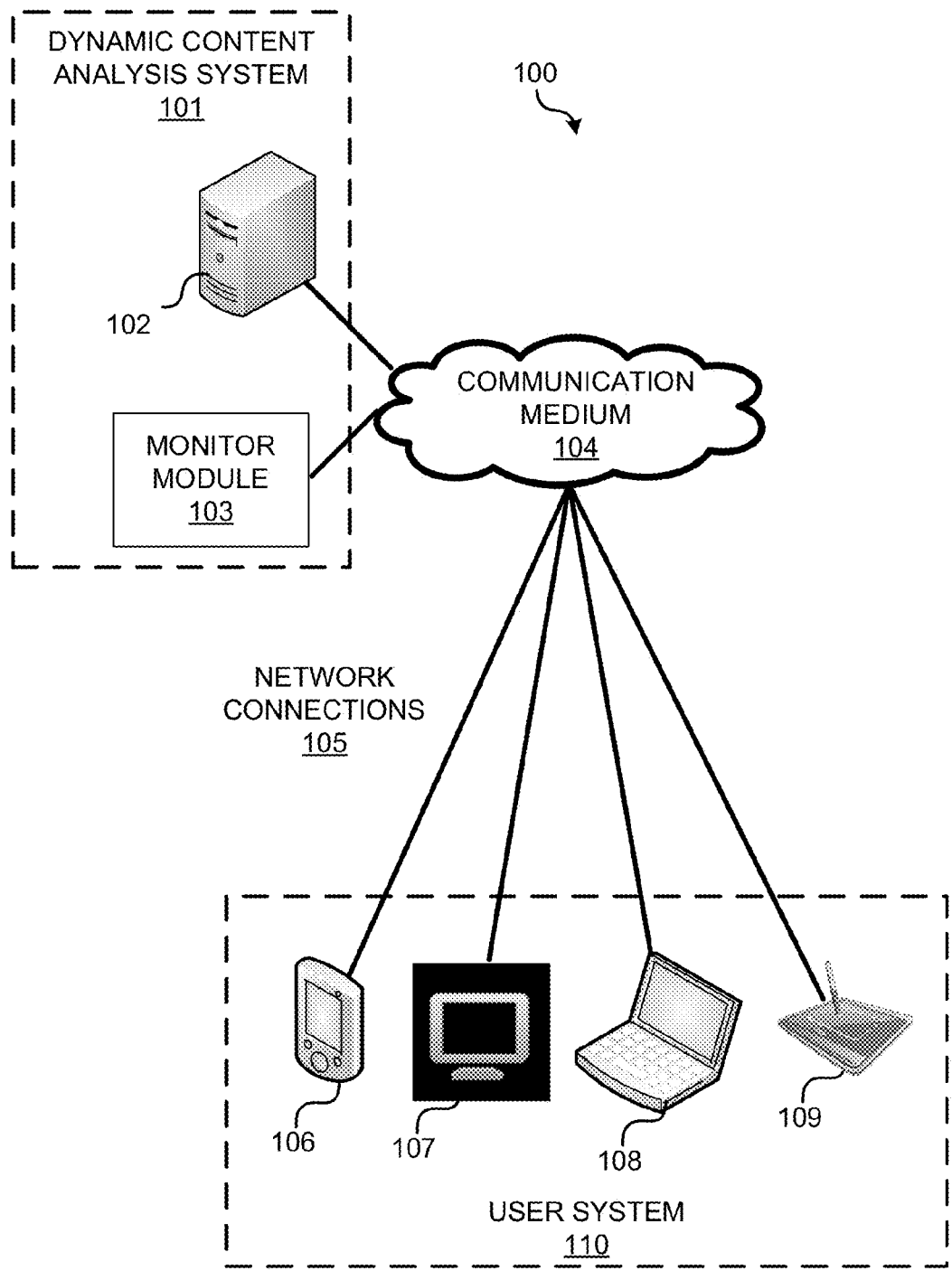
FIG. 1 illustrates an exemplary dynamic content analysis system implemented in an exemplary environment.

The figures are not intended to be exhaustive or to limit the application to the precise form disclosed. It should be understood that the application can be practiced with modification and alteration, and that the application be limited only by the claims and the equivalents thereof.

DETAILED DESCRIPTION OF THE EMBODIMENTS OF THE APPLICATION

Existing methods categorize media content that a user is watching for delivering personalized supplementary information such as searching or advertisement matching involving analyzing text data such as closed caption data associated with the media content. The text data is not always available, can be error prone, and conveys a limited, flat perspective of the media content. This is especially problematic in cases of live events such as sports events and other unscripted media where the text data has limited ability to reflect the emotion or sentiment. As a result, the search ability of search engines that index media contents based on analyzing the text data is rather limited.

Further, delivery of personalized supplementary information such as advertisements are more valuable at certain times of the media content that the user is watching, such as when emotions are running high, a critical play is about to happen or has just occurred, or a key story element is about to unfold. Conventional text data based analysis of media contents lacks the capability to identify these valuable moments, and thus misses the opportunity and the time window of delivering personalized supplementary information when it is most valuable.

Methods and systems of dynamic content analysis are provided herein. In particular, methods and systems of dynamic content analysis for categorizing media contents are provided. In various embodiments, data regarding the media contents that a user is watching on one or more devices may be obtained. The data may comprise media signals delivered to the devices and the display of the media contents. Scene analysis may be performed to process the data for categorizing the media contents. Scenes and events may be detected and recognized. Metadata categorizing the events and the media contents can be generated. The metadata may be further associated with a corresponding event.

In some embodiments, metadata may be psychometric metadata comprising psychological measurements of the user or a group of people. The psychometric metadata may be determined automatically or semi-automatically by scene analysis such as recognizing objects and people in a scene, analysis of sounds, or analysis of changes in scenes. Such psychometric metadata may be embedded or associated with media contents, particularly live and unscripted content. In some embodiments, tagging of live or unscripted content may be performed manually.

The solution provides real-time analysis of media contents that a user is watching and a much richer set of information, which may be used by downstream supplementary information distribution and handling systems. The metadata used in various embodiments may comprise standardized event descriptions or format. As such, supplementary information providers may recognize these standardized metadata and make real-time decisions as to what supplementary information, such as advertising, educational or public service information should accompany the content. Content providers and supplementary information providers can better meet each other's needs, avoiding ad-hoc and often inaccurate associations between supplementary information and the primary media contents that a user is watching that occurs today.

The dynamic content analysis is program agnostic and independent from service providers. In some embodiments, the environment in which the user is watching the media contents may be captured. The user's concurrent activities including the user's facial expressions, body movements, statements, and internet activities, may be gathered from secondary sources. Such information may be used in recognizing events that are related to the media contents and in determining supplementary information to be displayed to the user. User-tailored supplementary information or programs such as alternative endings and advertisements may be displayed based on dynamic analysis of content that the user is watching and collecting data related to the content that the user is watching. When there are multiple users watching the media contents, a primary user may be determined and supplementary information tailored to the primary user can be displayed.

Before describing the application in detail, it is useful to describe an example environment in which the application can be implemented. One such example is illustrated in FIG. 1.

FIG. 1 illustrates an exemplary dynamic content analysis system 101 implemented in an exemplary environment 100 comprising various user devices 106-109, which may be collectively referred to as a user system 110 connected via a communication medium 104. The dynamic content analysis system 101 may comprise a dynamic content analysis server module 102 and a monitor module 103. The dynamic content analysis system 101 may provide dynamic media content analysis services, based on which supplementary information may be determined and delivered to one or more user devices of the user system 110.

A media content may comprise a set of scenes describing one or more events, and an event is an occurrence of an observable happening or phenomenon at a particular time. Each scene may include an object and/or a person. Supplementary information related to the media content that a user is watching is relevant the events happening in the media content. In some embodiments, the dynamic content analysis system 101 may provide the analysis to supplementary information providers (not shown). In some embodiments, the dynamic content analysis system 101 may obtain and deliver supplementary information. In some embodiments, the communication medium may be a wired system, such as a coaxial cable system, a fiber optic cable system, an Ethernet cable system, or other similar communication medium. Alternatively, the communication medium may be a wireless network system, such as a wireless personal area network, a wireless local area network, a cellular network, or other similar communication medium.

As shown, a user system 110 may comprise a smartphone 106 (e.g., iPhone®), a TV 107, a computer 108 (e.g., a personal computer), and/or a tablet 109 (e.g., iPad®), through their respective network connections 105, can either interact directly or indirectly with the dynamic content analysis system 101. For example, a network connection 105 may include wired connections (e.g., Digital Subscriber Line (DSL), optical) and/or wireless connections (e.g., Wi-Fi.) In various embodiments, a network connection 105 may include an ad hoc network, an intranet, an extranet, a virtual private network (VPN), a local area network (LAN), a wireless LAN (WLAN), a wide area network (WAN), a portion of the Internet, a portion of the Public Switched Telephone Network (PSTN), a cellular telephone network, or any combination thereof. A network connection 105 need not necessarily be the same throughout the environment 100. Various user devices 106-109 and the dynamic content analysis system 101 described herein may be implemented using the example computer system illustrated in FIG. 5.

A platform to analyze and categorize media contents may be hosted by the dynamic content analysis system 101, which may be accessed by a user using the monitor module and/or any user device 106-109. In various embodiments, the monitor module 103 may capture data regarding media contents that a user is watching on one or more user devices 106-109. For example, the monitor module 103 may obtain media signals being delivered to any user device of the user system 110, or observe the media contents that the user is watching. In further embodiments, the monitor module 103 may obtain the user's concurrent activities while watching the media contents, such as the user's location, the user's facial expressions, body movements, or statements. In various embodiments, the monitor module 103 may comprise multiple sub-modules at different locations of the environment 100 such that data regarding all media contents that a user is watching and/or the user's concurrent activities may be obtained. For example, one sub-module may be located at a set up box to obtain the media signal delivered to a TV, and another sub-module may be located at a router to collect the media signals delivered to a computer. Further sub-modules may be located in a living room facing the user, and in the living room facing the TV.

In various embodiments, the user system 110 can display any interface related to the dynamic content analysis system 101. For example, the user system 110 may be configured to receive a supplementary information input (or request) from a user, to transmit the supplementary information input to the dynamic content analysis system 101, and to receive supplementary information from the dynamic content analysis system 101. A user may create and customize a user's profile on the dynamic content analysis system 101. The user's profile may comprise the user's information such as his or her preferred type(s) of supplementary information, hobbies, favorite TV show(s), favorite sports, etc. The user's profile and information included therein may be used to determine user-tailored supplementary information.

In one embodiment, a user may download a client component of a dynamic content analysis system 101 such as a dynamic content analysis application. The client component may be executed locally at a user system 110, whereas the dynamic content analysis system 101 may provide back-end support for the client component. Dynamic content analysis system 101 may be responsible for collecting data regarding media contents that a user is watching, collecting the user's concurrent activities when the user is watching the media contents, processing inputs from users, analyzing the media contents, determining supplementary information, determining the best time to deliver the supplementary information, obtaining and delivering the supplementary information, gathering user data, and transmitting instructions to one or more user devices of the user system 110.

Figure 2:
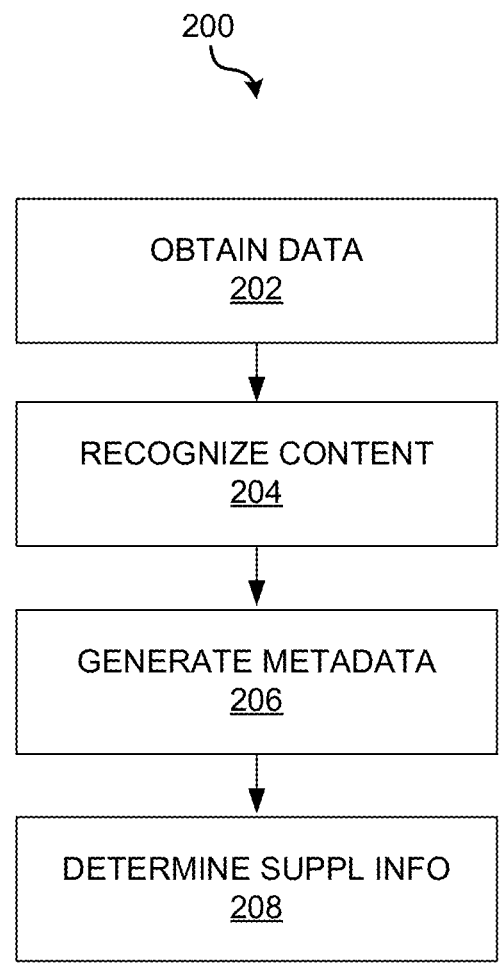
FIG. 2 is a flow diagram illustrating an exemplary method of performing dynamic content analysis, such as for the dynamic content analysis system in FIG. 1.

FIG. 2 is a flow diagram illustrating an exemplary method 200 of performing dynamic content analysis, such as for the dynamic content analysis system 101 in FIG. 1. At step 202, data regarding media contents that a user is watching is obtained. The user may watch the media contents on one or more devices, such as user devices 106-109 of the user system 110 of FIG. 1. In some embodiments, media signals delivered to the devices on which the media contents are being displayed may be obtained. In further embodiments, the environment in which the user is watching the media contents may be captured for obtaining such data. As such, all media contents including images, videos, and sounds that are being played as well as the user's concurrent activities such as the user's location, facial expressions, body movements, and statements may be collected. In further embodiments, the user's internet activities are also gathered. The user's internet activities may include the website that the user is visiting, the information that the user is publishing such as live feeds, micro-blogging postings, social network activities, search queries, online chats, etc.

At step 204, the media contents that the user is watching are recognized. In particular, one or more events happening in the media contents are detected and recognized. In one embodiment, scene analysis is conducted. For example, various objects and people in a scene may be detected and recognized, sounds may be detected and analyzed, and changes in scenes may be detected and recognized. Various pattern recognition technologies may be performed including color tracing, scene recognition, face detection and registration, facial expression detection and recognition, etc. In another embodiment, existing metadata embedded in the media content may be processed, such as a close caption, copy control information, or an operator's or subscriber's watermark.

At step 206, metadata for categorizing media contents is generated. Media contents may be categorized by the events happening in the media contents. For example, when a basketball player scores at the last second of the last quarter of a game, metadata such as "sports," "basketball game," and "the basketball player just scored" may be generated to categorize this live broadcast. In some embodiments, the metadata may further comprise descriptions of the event, such as a standardized event description that is recognized by various media content service providers and distributers, or a natural language event description. In various embodiments, the metadata may be associated with the corresponding event.

In some embodiments, metadata may be psychometric metadata comprising psychological measurements of the user or a group of people. The psychometric metadata may be determined by scene analysis such as recognizing objects and people in a scene, analysis of sounds, and analysis of changes in scenes of the media content. Psychometric metadata may be further determined by processing the user's concurrent activities while watching the media content. Such psychometric metadata may be embedded or associated with the media contents. In some embodiments, tagging of live or unscripted content with psychometric metadata may be performed manually.

Subsequently, at step 208, the appropriate supplementary information related to the media contents is determined. The appropriate supplementary information is supplementary information that may accompany the media contents, including advertisements, educational information, alternative endings, etc. The supplementary information may be determined by using the metadata generated at step 206. In further embodiments, the supplementary information may be determined by using further information collected from secondary sources. Independent data aggregation from secondary sources may be performed. In various embodiments, the user-configured event setup defining the appropriate supplementary information for an event, the user's commands regarding whether certain supplementary information should be displayed, the user's dynamic content analysis personal profile including the user's preferences and attributes, and social networks (e.g., the user's Facebook® profile, the user's twitter® feed including event hashtags), and live news (e.g., live event scores) may be aggregated. This further information may be used in addition to the metadata to determine the supplementary information to be delivered to the user.

In various embodiments, the timing of the delivering such supplementary information may also be determined. In some embodiments, a primary user may be identified when there are multiple users watching the media contents. The supplementary information to be displayed is determined based on the primary user's activities and preferences.

Figure 3A:
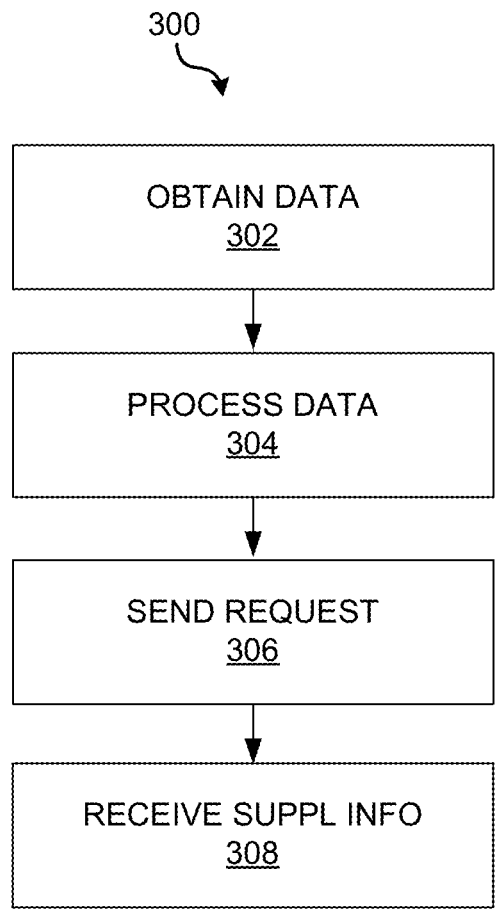
FIG. 3A is a flow diagram illustrating an exemplary method of a device (such as the monitor module in FIG. 1) performing dynamic content analysis.

FIG. 3A is a flow diagram illustrating an exemplary method 300 of performing dynamic content analysis, for example, using monitor module 103 of FIG. 1. At step 302, data regarding media contents that a user is watching is obtained. Step 202 in FIG. 2 may be performed to obtain such data. At step 304, the data obtained is processed to determine the appropriate supplementary information to be displayed on one or more devices that the user uses to watch the primary media content. Steps 204, 206, and 208 in FIG. 2 may be performed to process such data. Subsequently, at step 306, a request requesting the supplementary information is generated and sent to a dynamic content analysis server, such as the dynamic content analysis server module 102 in FIG. 1. At step 308, the device receives the supplementary information. The device may display the received supplementary information. In another embodiment, the dynamic content analysis server may determine a user device, other than the device that sends the request, for displaying the supplementary information according to factors such as the device type, the content of the supplementary information, the user's records of using various devices, etc.

Figure 3B:
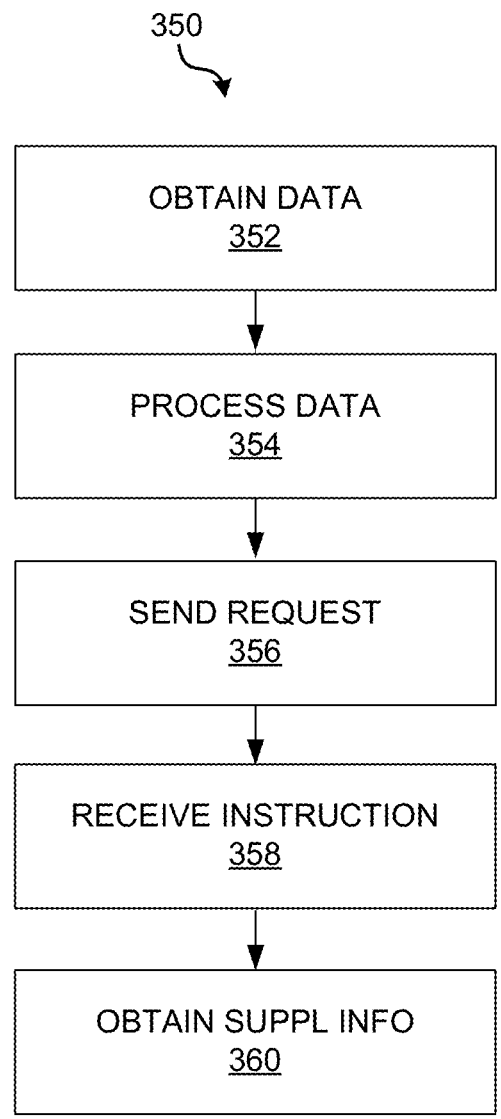
FIG. 3B is a flow diagram illustrating an exemplary method of a device (such as the monitor module in FIG. 1) performing dynamic content analysis.

FIG. 3B is a flow diagram illustrating an exemplary method 350 of performing dynamic content analysis, for example, using monitor module 103 of FIG. 1. At step 352, data regarding media contents that a user is watching is obtained. Step 202 in FIG. 2 may be performed to obtain such data. At step 354, the data obtained is processed to determine appropriate supplementary information related to the media contents that the user is watching to be displayed on one or more of the devices. Steps 204, 206, and 208 in FIG. 2 may be performed to process the data. Subsequently, at step 356, a request requesting the supplementary information is generated and sent to a dynamic content analysis server, such as the dynamic content analysis server module 102 in FIG. 1. At step 358, the device receives an instruction on how to obtain the supplementary information. The instruction may include the website and the authentication information for retrieving the supplementary instruction. At step 360, the supplementary information is obtained by following the instruction received. The device may display the received supplementary information. In another embodiment, the dynamic content analysis server may determine a user device, other than the device which sends the request, for displaying the supplementary information according to factors such as the device type, the content of the supplementary information, the user's records of using various devices, etc.

Figure 4A:
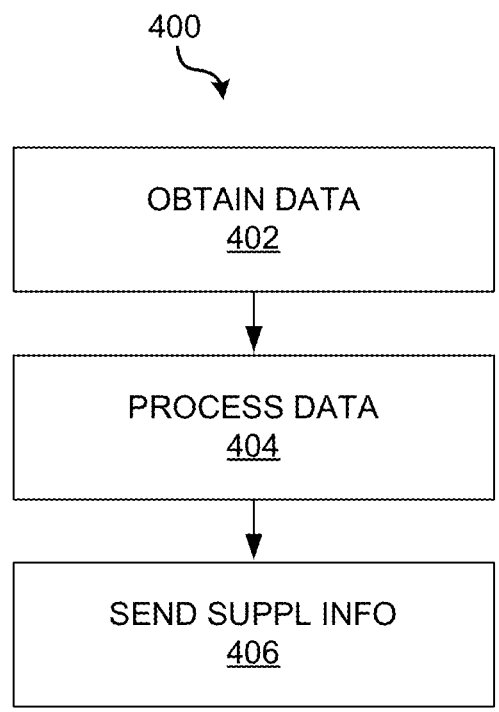
FIG. 4A is a flow diagram illustrating an exemplary method of a server (such as the dynamic content analysis server module in FIG. 1) performing dynamic content analysis.

FIG. 4A is a flow diagram illustrating an exemplary method 400 of performing dynamic content analysis. Method 400 can be performed, for example, by dynamic content analysis server module 102 in FIG. 1. At step 402, data regarding media contents that a user is watching is obtained. The server receives the data, which is obtained by a device performing step 202 in FIG. 2. At step 404, the data is processed to determine the appropriate supplementary information to be displayed on one or more devices. Steps 204, 206, and 208 in FIG. 2 may be performed to process the data. Subsequently, at step 406, the supplementary information is sent to one or more devices for display.

Figure 4B:
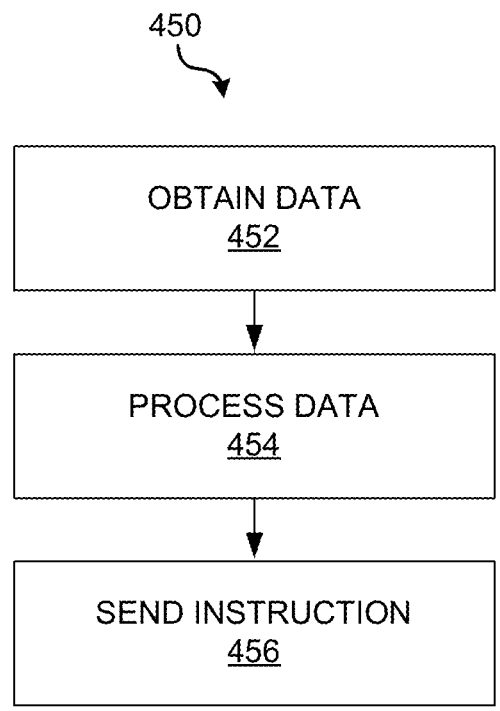
FIG. 4B is a flow diagram illustrating an exemplary method of a server (such as the dynamic content analysis server module in FIG. 1) performing dynamic content analysis.

FIG. 4B is a flow diagram illustrating an exemplary method 450 of performing dynamic content analysis. Method 450 can be performed, for example, by dynamic content analysis server module 102 in FIG. 1. At step 452, data regarding media contents that a user is watching is obtained. The server receives the data, which is obtained by a device performing step 202 in FIG. 2. At step 454, the data is processed to determine the appropriate supplementary information to be displayed on one or more devices. Steps 204, 206, and 208 in FIG. 2 may be performed to process the data. In further embodiments, information pertaining to obtaining the supplementary information such as the website and the authentication information is determined. Subsequently, at step 456, an instruction on how to obtain the supplementary information is sent to one or more devices, which may follow the instruction to obtain and display the supplementary information.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 2. Various embodiments are described in terms of this example-computing module 200. After reading this description, it will become apparent to a person skilled in the relevant art how to implement the application using other computing modules or architectures.

Figure 5:
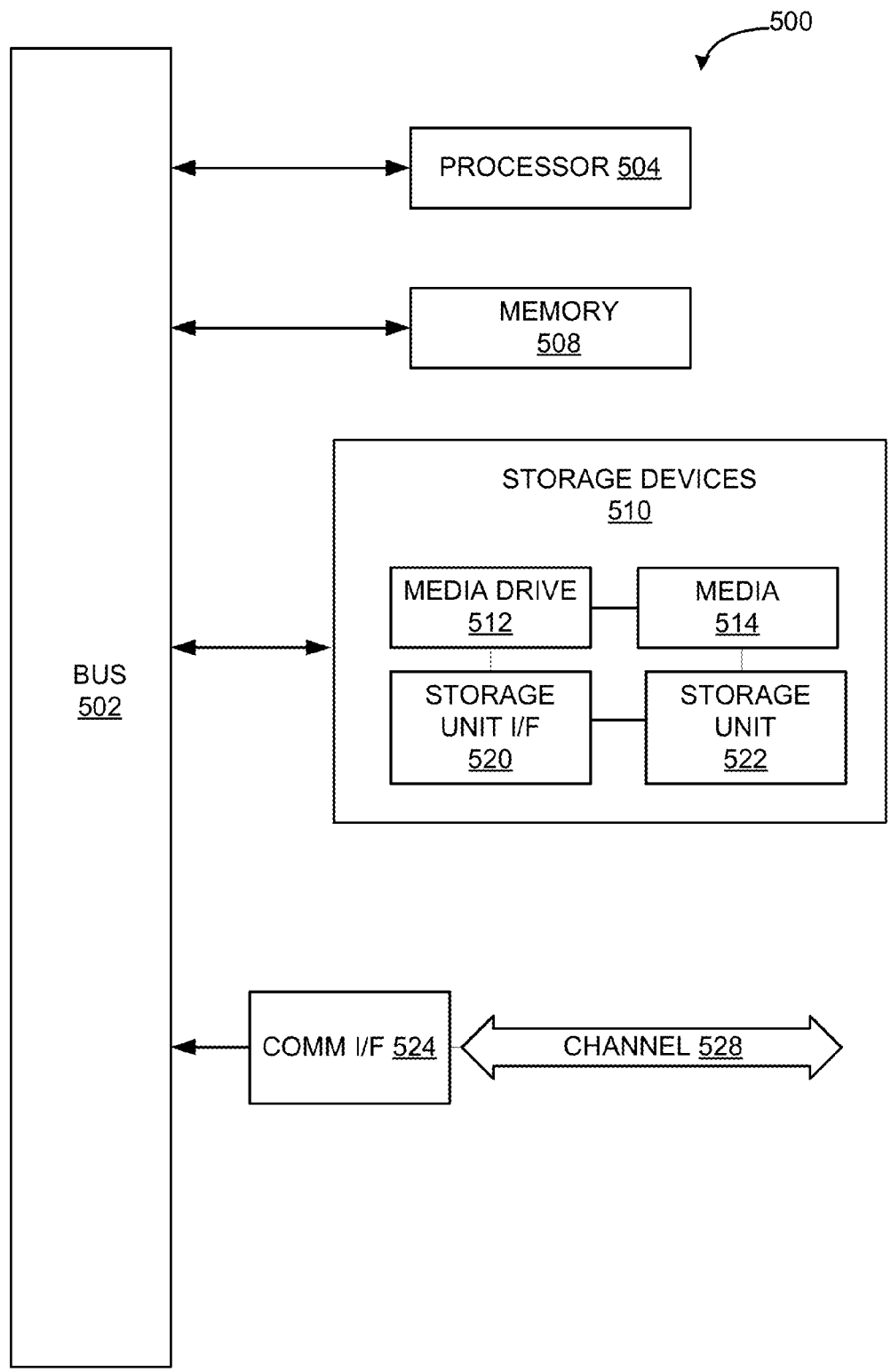
FIG. 5 illustrates an example computing module that may be used in implementing various features of embodiments of the application.

Referring now to FIG. 5, computing module 500 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 508, storage unit 520, storage media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
    obtaining data on media contents that is being sent to a set of devices, wherein the data comprises media signals delivered to at least one of the set of devices, wherein the media contents comprises a live broadcast, an unscripted media, or a combination of both;
    processing, in real-time, the data to recognize dynamically one or more events happening within the media contents as the data is being sent to the set of devices, the processing comprising one or more of color tracing, scene recognition, facial expression detection and recognition, or a combination thereof, the events comprising one or more objects, persons, sounds, scene characteristics, or a combination thereof within the data being sent to the set of devices;
    generating real-time content metadata categorizing the media contents based on the recognized events happening within the media contents, the real-time content metadata comprising one or more newly created metadata tags not previously associated with the data and describing the recognized events happening within the media contents;
    associating the data with the real-time content metadata; and
    generating and transmitting a request for supplementary information related to the media contents by using the real-time content metadata.

2. The computer-implemented method of claim 1, further comprising receiving the supplementary information related to the media contents.

3. The computer-implemented method of claim 1, further comprising:
receiving an instruction on obtaining the supplementary information related to the media contents; and
processing the instruction to obtain the supplementary information related to the media contents.

4. The computer-implemented method of claim 1, wherein the supplementary information is related to a personal profile of the user, the method further comprising creating the personal profile associated with the user, the personal profile comprising a user's historical activity or a user's preference.

5. The computer-implemented method of claim 1, wherein the real-time content metadata further describe an event, the real-time content metadata comprising a standardized event description to a natural language event description.

6. The computer-implemented method of claim 1, wherein the supplementary information is further related to a concurrent activity of the user;
the method further comprising:
obtaining second data on the concurrent activity of the user; and
processing the second data to determine the concurrent activity of the user.

7. The computer-implemented method of claim 6, wherein the concurrent activity comprises a facial expression of the user, a body movement of the user, a voice of the user, or an internet activity of the user.

8. The computer-implemented method of claim 6, wherein the first user is a dominant user between the first user and a second user, the method further comprising:
obtaining second data on a second concurrent activity of a second user; and transcoding module; and
processing the second data to recognize a dominant user between the first user and the second user.

9. The computer-implemented method of claim 1, wherein the step of processing the data comprises reading existing metadata encoded in a media signal and analyzing the existing metadata, and wherein the existing metadata comprises a closed caption, copy control information, or an operator watermark.

10. The computer-implemented method of claim 1, wherein the step of processing the data comprises detecting an image or a sound of the media contents and analyzing the image or the sound detected.

11. A computer-implemented method, comprising:
receiving obtained data on media contents that is being sent to a set of devices from at least one of the set of devices, wherein the data comprises media signals delivered to at least one of the set of devices, wherein the media contents comprises a live broadcast, an unscripted media, or a combination of both;
processing, in real-time, the data to recognize dynamically one or more events happening within the media contents, the processing comprising one or more of color tracing, scene recognition, facial expression detection and recognition, or a combination thereof, the events comprising one or more objects, persons, sounds, scene characteristics, or a combination thereof within the data being sent to the set of devices;
generating real-time content metadata categorizing the media contents based on the dynamically recognized events happening within the media contents, the real-time content metadata comprising one or more newly created metadata tags not previously associated with the data and describing the recognized events happening within the media contents;
associating the data with the real-time content metadata; and
generating and transmitting a request for supplementary information related to the media contents by using the real-time content metadata.

12. The computer-implemented method of claim 11, further comprising transmitting the supplementary information related to the media contents to the set of devices.

13. The computer-implemented method of claim 11, further comprising:
determining an instruction on obtaining the supplementary information related to the media contents; and
transmitting the instruction to the set of devices.

14. The computer-implemented method of claim 11, wherein the supplementary information is related to a personal profile of the user, the method further comprising creating the personal profile associated with the user, the personal profile comprising a user's historical activity or a user's preference.

15. The computer-implemented method of claim 11, wherein the real-time content metadata further describe an event, the real-time content metadata comprising a standardized event description or a natural language event description.

16. The computer-implemented method of claim 11, wherein the supplementary information is further related to a concurrent activity of the user; the method further comprising:
obtaining second data on the concurrent activity of the user; and
processing the second data to determine the concurrent activity of the user.

17. The computer-implemented method of claim 16, wherein the concurrent activity comprises a facial expression of the user, a body movement of the user, a voice of the user, or an internet activity of the user.

18. The computer-implemented method of claim 16, wherein the first user is a dominant user between the first user and a second user, the method further comprising:
obtaining second data on a second concurrent activity of a second user; and
processing the second data to recognize a dominant user between the first user and the second user.

19. The computer-implemented method of claim 18, wherein the step of processing the data comprises reading existing metadata encoded in a media signal and analyzing the existing metadata, wherein the existing metadata comprises a closed caption, copy control information, or an operator watermark.

20. The computer-implemented method of claim 19, wherein the step of processing the data comprises detecting an image or a sound of the media contents and analyzing the image or the sound detected.

21. An apparatus, comprising:
non-transitory memory storing a set of instructions; and
a processor coupled to the non-transitory, wherein the set of instructions are configured to cause the processor to:
obtain data on media contents that is being sent to a set of devices, wherein the data comprise a signal delivered to a first device of the set of devices or a recording of the user and a video being played on a second device of the set of devices, wherein the media contents comprises a live broadcast, an unscripted media, or a combination of both;

process, in real-time, the data to recognize dynamically one or more events happening within the media contents, the processing comprising one or more of color tracing, scene recognition, facial expression detection and recognition, or a combination thereof, the events comprising one or more objects, persons, sounds, scene characteristics, or a combination thereof within the data being sent to the set of devices;

generate real-time content metadata categorizing the media contents based on the dynamically recognized events happening within the media contents, the real-time content metadata comprising one or more newly created metadata tags not previously associated with the data and describing the recognized events happening within the media contents;

associating the data with the real-time content metadata; and generate and transmit a request for supplementary information related to the media contents by using the real-time content metadata.

\* \* \* \* \*